(12) United States Patent
Goggins

(10) Patent No.: US 6,995,913 B2
(45) Date of Patent: Feb. 7, 2006

(54) DIGITALLY IMAGED LENTICULAR PRODUCTS INCORPORATING CUSTOMIZED ELEMENTS

(75) Inventor: Timothy P. Goggins, Nashotah, WI (US)

(73) Assignee: National Graphics, Inc., Brookfield, WI (US)

( * ) Notice: Subject to any disclaimer, the term of this patent is extended or adjusted under 35 U.S.C. 154(b) by 0 days.

(21) Appl. No.: 10/755,151

(22) Filed: Jan. 9, 2004

(65) Prior Publication Data

US 2005/0152041 A1    Jul. 14, 2005

(51) Int. Cl.
G02B 27/10    (2006.01)

(52) U.S. Cl. ...................................... 359/619; 359/626
(58) Field of Classification Search ................ 359/619, 359/625, 626, 462, 463
See application file for complete search history.

(56) References Cited

U.S. PATENT DOCUMENTS

| | | | |
|---|---|---|---|
| 5,113,213 A | 5/1992 | Sandor et al. ................. 355/22 |
| 5,266,995 A | 11/1993 | Quadracci et al. ............. 355/77 |
| 5,278,608 A | 1/1994 | Taylor et al. .................. 355/22 |
| 5,436,738 A | 7/1995 | Manico ....................... 358/503 |
| 5,457,515 A | 10/1995 | Quadracci et al. .......... 355/132 |
| 5,488,451 A | 1/1996 | Goggins ....................... 355/77 |
| 5,592,332 A | 1/1997 | Nishio et al. ............... 359/619 |
| 5,617,178 A | 4/1997 | Goggins ....................... 355/22 |
| 5,847,808 A | 12/1998 | Goggins ....................... 355/22 |
| 5,896,230 A | 4/1999 | Goggins ..................... 359/619 |
| 6,177,217 B1 * | 1/2001 | Agostinelli et al. ........... 430/22 |
| 6,198,544 B1 | 3/2001 | Wess et al. .................. 358/296 |
| 6,329,987 B1 * | 12/2001 | Gottfried et al. ........... 345/419 |
| 6,373,637 B1 * | 4/2002 | Gulick et al. ............... 359/619 |
| 6,424,467 B1 | 7/2002 | Goggins ..................... 359/626 |
| 6,490,092 B1 | 12/2002 | Goggins ..................... 359/619 |
| 6,781,761 B2 | 8/2004 | Raymond ................... 359/619 |
| 2002/0075566 A1 * | 6/2002 | Tutt et al. ................... 359/619 |
| 2002/0167679 A1 | 11/2002 | Nims et al. .................. 358/1.2 |
| 2003/0002160 A1 | 1/2003 | Johnson et al. ............. 359/619 |
| 2003/0016370 A1 | 1/2003 | Goggins ..................... 358/1.2 |
| 2003/0128865 A1 | 7/2003 | White ......................... 382/113 |
| 2003/0169468 A1 | 9/2003 | Menz et al. ..................... 359/2 |
| 2003/0183695 A1 | 10/2003 | Labrec et al. ............... 235/487 |
| 2004/0157195 A1 * | 8/2004 | Andresen .................... 434/130 |

FOREIGN PATENT DOCUMENTS

EP    0 953 935 A2    11/1999

* cited by examiner

Primary Examiner—Ricky Mack
(74) Attorney, Agent, or Firm—Whyte Hirschboeck Dudek SC

(57) ABSTRACT

Disclosed herein is a digitally imaged lenticular product comprising a lenticular lens having an array of lenticules defining a front surface, and a substantially flat back surface located opposite the front surface. The product further includes a digitally output interlaced image digitally printed and joined to the flat back surface of the lens so as to be in correspondence with the array of lenticules. The digitally output interlaced image includes at least one individually customizable element. The digitally imaged lenticular products can be part of a variety of consumer end products, such as a container, a cup, a label, and a package. This permits final digitally imaged lenticular products to have a wide range of variance and versions, both from one lenticular run to the next, as well as within a run, thereby accommodating individualized data.

5 Claims, 11 Drawing Sheets

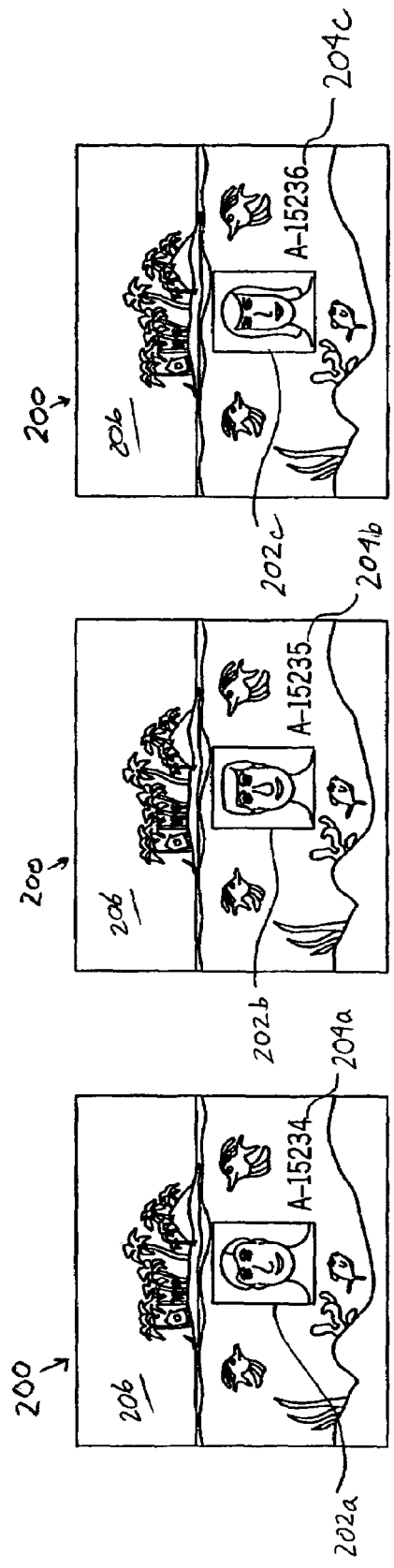

DIGITALLY IMAGED LENTICULAR PRODUCTS INCORPORATING CUSTOMIZED ELEMENTS

BACKGROUND OF THE INVENTION

This invention relates generally to digitally imaged lenticular products, and more specifically to digitally imaged lenticular products incorporating customized elements.

Digital printing has revolutionized the printing industry in many ways. The introduction of digital press printing has brought specific benefits previously unparalleled in the lithographic printing arena, particularly in the cost and press time efficiencies associated with the production of make-ready samples, offline plate imaging, availability of "want one, print one" low press run viable capabilities, reduction of press operators, increasing sheet per hour production, individual variability without changing output rate, increasing quality of the press proofs, among others.

Particular media have been used with digital printing presses to create superior quality end products. However, digital press printing with lenticular plastic media has been limited, with the field plagued by problems of quality, reliability and lenticular selection problems. Part of the problem resides in the fact because a specific digital press machine will operate at a substantially fixed resolution, printing will occur at that resolution, which may result in scaling or improper screening of the desired images. Some problems associated with current attempts at lenticular digital press output include, among others, banding, contaminating, out of focus, soft images, double picture data, image degradation, ghosting (latent images) and other artifacts or non-clean, crisp graphics.

Specifically, the selection process and incorporation of lenticular lens media into the digital press output process has been problematic. It has heretofore been a challenge to be able to determine a specific lenticular lens media resolution for a specific digital press to produce high quality, reproducible and commercially acceptable output not plagued by the aforementioned output problems. As digital press machine resolutions vary (from model to model) and even from machine to machine to some extent, it is increasingly desirable to be able to determine an optimal lenticular lens media resolution that accounts for the number of frames desired and the specific machine resolution. Further, it has been further identified as a need to be able to have software programming that works with a digital printing press to use the selected lenticular lens media parameters to create master files that, when printed to a lenticular lens media, are properly interlaced and minimize degradation of the individual images (comprising frames) that are printed to the selected lenticular lens media to create a lenticular image.

Moreover, because of the interrelationship among the digital press, lenticular lens media and the imaging files, there is a need for a lenticular lens digital imaging solution that can take individual or layered image frame files, interlace and combine them into a master image file, the parameters of which are set to correspond to a specific lenticular lens media, and from which the master image file can be printed via the digital press to the lenticular lens media. Since a given lenticular lens media will produce differing results on different digital presses, there is also a need to correspond the lenticular lens media to the specific digital press within the context of the digital imaging solution. At the same time there is additional benefit to having the selected lenticular lens be of a standard lens parameter, to further reduce digital lenticular printing costs.

The concept of mass customization has increased the popularity of individually tailored and person to person variation on a wide spectrum of products. Oftentimes products will lend themselves to changes from one person to another, particularly where personal information is presented or specific accounts or license numbers are printed. One of the benefits of digital press printing is the ability to vary the individual data presented, for example pictures, names, alphanumeric identifiers, as well as the backgrounds, styles and colors within a single print run, and to reduce the minimum required run to make a run commercially profitable (low volume or "on-demand" printing). Given the frame by frame changes, depth control and movement possible with lenticular imagery, and their increased use and popularity, there is a continuing need to further develop digital press printing capabilities with respect to interlaced images and printing to lenticular lens media to incorporate such individual data and variable backgrounds, styles and colors into digital press printed lenticular products. Where such capabilities have been explored, there has been found in the marketplace a need to improve the quality of the final digital press printed lenticular products to a commercially acceptable level of quality and repeatability. The technical nature of printing to lenticular lenses and the accuracy and correspondence required with variable data fields to produce quality results makes the specialized decisions of lenticular lens selection, screening of the variable data, layering of background and foreground graphic data and interlacing of the variable data critical to yield lenticular products of this type that can be successfully printed with a digital press. The current state of the art has not been able to successfully produce such products. Therefore, the need exists for a digital press printed lenticular product that incorporates individualized, customized or variable data fields that can be used as or in conjunction with interlaced images and be printed successfully to lenticular lenses.

BRIEF SUMMARY OF THE INVENTION

Disclosed herein is a digitally imaged lenticular product comprising a lenticular lens having an array of lenticules defining a front surface, and a substantially flat back surface located opposite the front surface. The product further includes a digitally output interlaced image digitally printed and joined to the flat back surface of the lens so as to be in correspondence with the array of lenticules. The digitally output interlaced image includes at least one individually customizable element.

Advantageously, the digitally imaged lenticular products can have a wide range of variance and versions, both from one lenticular run to the next, as well as within a run (i.e., from one lenticular image or product to the next), thereby accommodating individualized data.

Other embodiments, aspects and advantages will become apparent in view of the teachings that follow, including the drawings.

BRIEF DESCRIPTION OF THE DRAWINGS

The drawings illustrate the best mode presently contemplated for carrying out the invention.

In the drawings:

FIGS. 6A–C illustrate digitally imaged lenticular products having individualized graphic elements and variable serial data with a given background version;

FIGS. 6D–F illustrate digitally imaged lenticular products having versioned background elements and variable serial data with a given individualized graphic element;

DETAILED DESCRIPTION OF THE INVENTION

Figure 1:
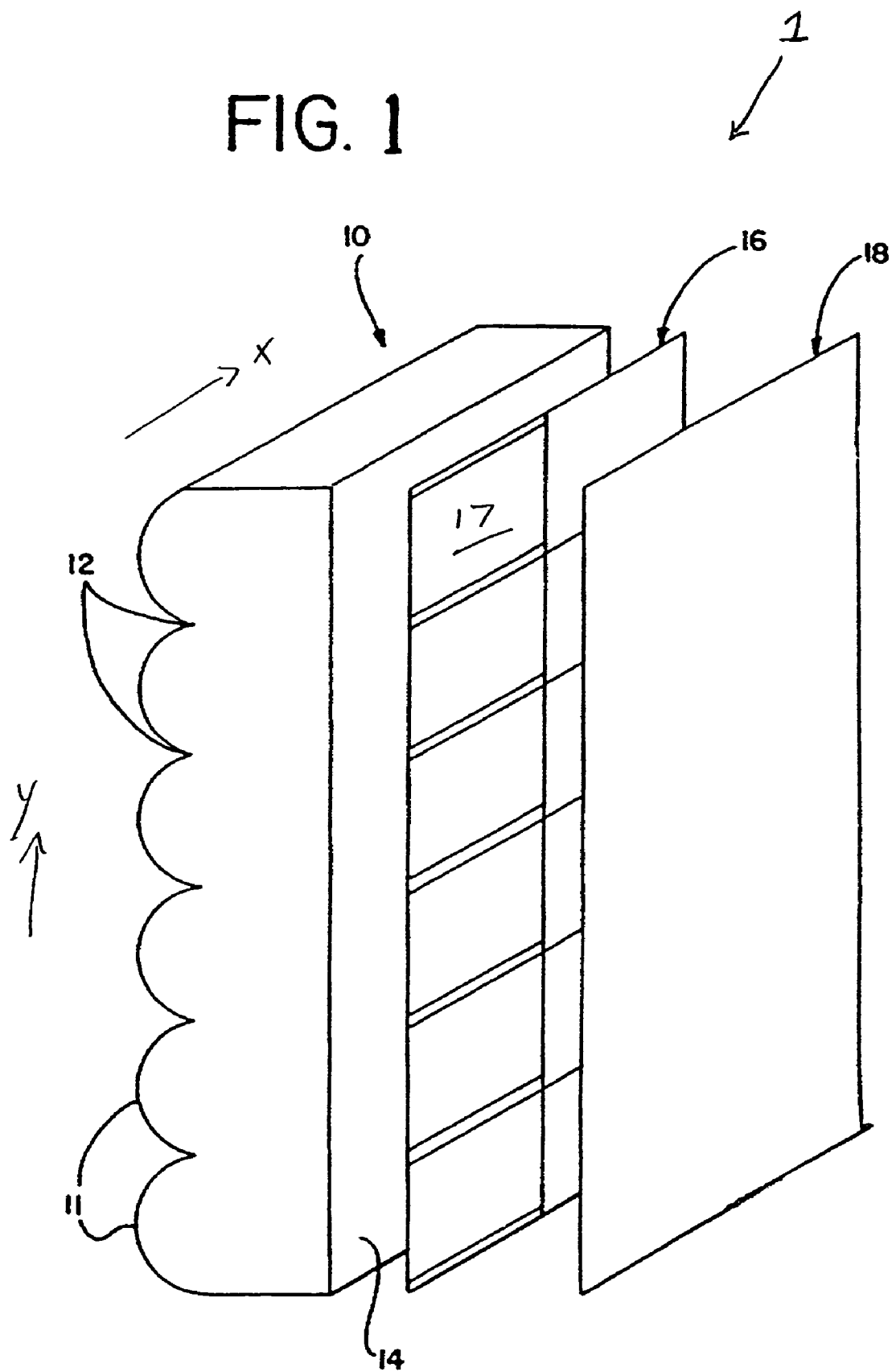
FIG. 1 is a schematic representation of a digitally output lenticular image made using the present invention.

FIG. 1 illustrates a digitally output lenticular image 1 made using the present invention. As shown, the image 1 includes a lenticular lens 10 which has a plurality of equally spaced, parallel lenticular lines 12 and a substantially planar back surface 14. The lenticular lines 12 define lenticules 11 through which a viewer can see an interlaced image 16, which is a composite multidimensional image. In general, interlaced image 16 is joined to the flat back surface 14 of lenticular lens 10. In one preferred embodiment, interlaced image 16 is printed directly to the back surface 14 of the lenticular lens 10, e.g., as taught in U.S. Pat. No. 5,457,515, the disclosure of which is incorporated herein by reference. Alternatively, the interlaced image 16 can be printed to a substrate 18 (e.g., paper, synthetic paper, plastic, metal, glass, or wood) and the substrate and image subsequently joined (e.g., using an adhesive) to the flat back surface 14 of the lenticular lens 10.

Lenticular lenses take the form of a transparent plastic sheet or web, and the sheet typically includes an array of identical curved or ribbed surfaces that are formed (e.g., cast, coated, embossed, extruded, or co-extruded) on the front surface of the plastic sheet. The back surface of the lens is typically flat. Each lenticule or individual lens is typically a section of a long cylinder that focuses on, and extends over, substantially the full length of an underlying image. Other lens shapes or profiles are possible (for instance, pyramidal, trapezoidal, parabolic, elliptical and the like). The lenticular lens is generally selected to accommodate both the underlying image and the distance from which the image will ordinarily be viewed (i.e., the viewing distance). Lenticular lenses and their technology are well-known and commercially available. Methods for using lenticular lens technology are described in detail in U.S. Pat. Nos. 5,113,213 and 5,266,995, the disclosures of which are incorporated herein by reference. Lenticular lens technologies are more fully described in U.S. Pat. Nos. 6,424,467 and 5,592,332 and U.S. patent application Publication No. US 2003/0002160 A1, the disclosures of which are incorporated herein by reference.

A "lenticular image" (e.g., the image 1 of FIG. 1) comprises an interlaced image 16 (also called an underlying or precursor image) that has been joined to a lenticular lens 10. The precursor image is a composite of two or more component images or frames that are themselves preferably of photographic quality. The component images are selected based upon the desired features of the lenticular or final image. The component images are then arranged, segmented, interlaced and mapped to create the precursor image so that the precursor image corresponds with the lenticular lens in any convenient manner, e.g., such as those taught in U.S. Pat. Nos. 5,488,451; 5,617,178; 5,847,808 and 5,896,230, the disclosures of which are incorporated herein by reference. In this fashion, the precursor or interlaced image can be called a "composite, multidimensional image" as noted above. Interlaced images can be applied to surfaces of varying shapes, such as shapes including one or more curved regions, as taught in U.S. Pat. No. 6,490,092, the disclosure of which is incorporated herein by reference.

Still referring to FIG. 1, a primary goal of the method to be described is to ensure that correspondence between the interlaced image 16 and the lenticular lens 10 is achieved in the digital press environment (i.e., when the interlaced image is digitally printed to the lenticular lens or otherwise joined thereto). As used in the context of a lenticular image, "correspondence" means that each interlaced segment 17 is covered or substantially covered by one lenticule 11 and that the lenticule and interlaced segment are substantially congruent with one another. Correspondence is confirmed by viewing the interlaced image (i.e., the image comprising the interlaced segments arranged in the desired order) through the lenticular lens (i.e., the lenticular image) at a predetermined or desired viewing distance, and determined whether the appropriate multidimensional effect (e.g., flip, motion, 3D, or a combination thereof) has been achieved. Stated succinctly, the desired lenticular result is achieved, and therefore, the need to select or determine the appropriate lens resolution or pitch is paramount.

As a practical matter, there is typically not a precise one-to-one correspondence between an interlaced image segment of a corresponding interlaced image and the lenticule of the lens which overlays the segment. Each interlaced image segment can be made coarser (i.e., wider) or finer (i.e., narrower) than the lenticule of the lens which overlays it. Correspondence can be confirmed by viewing the interlaced image through the lenticular lens at a predetermined or desired viewing distance to determine whether the desired illusion of multidimensionality is created.

Figure 1A:
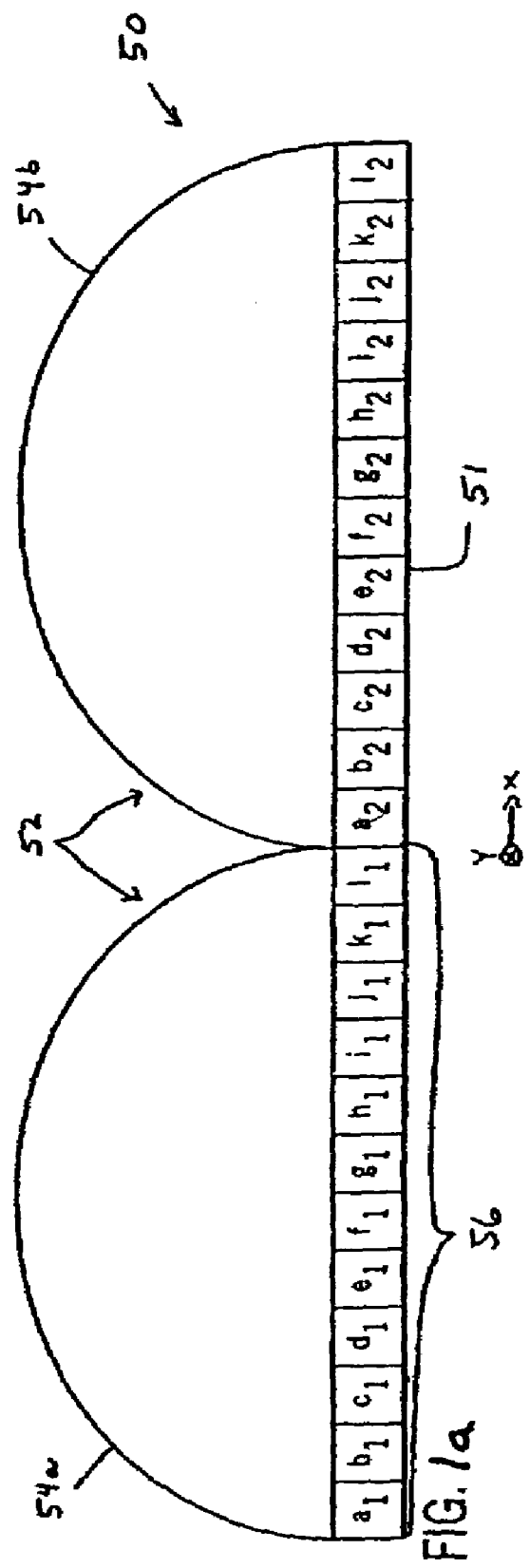
FIG. 1a is a schematic end view of a digitally output lenticular image in which an interlaced image is joined to a lenticular lens, and showing correspondence between interlaced image segments of the interlaced image and lenticules of the lenticular lens.

FIG. 1a shows a schematic end view of a digitally output lenticular image in which an interlaced image is joined to a lenticular lens, and further shows correspondence between interlaced image segments of the interlaced image and lenticules of the lenticular lens. The entire interlaced segment 56 is covered or substantially covered by lenticule 54a. In practice, lenticular image 50 will provide an illusion of multidimensionality to a viewer with little, if any, distortion. Achieving correspondence in the digital environment results in crisp, clear lenticular imaging, and thus, is paramount to overall commercial value for lenticular product sold.

Figure 2:
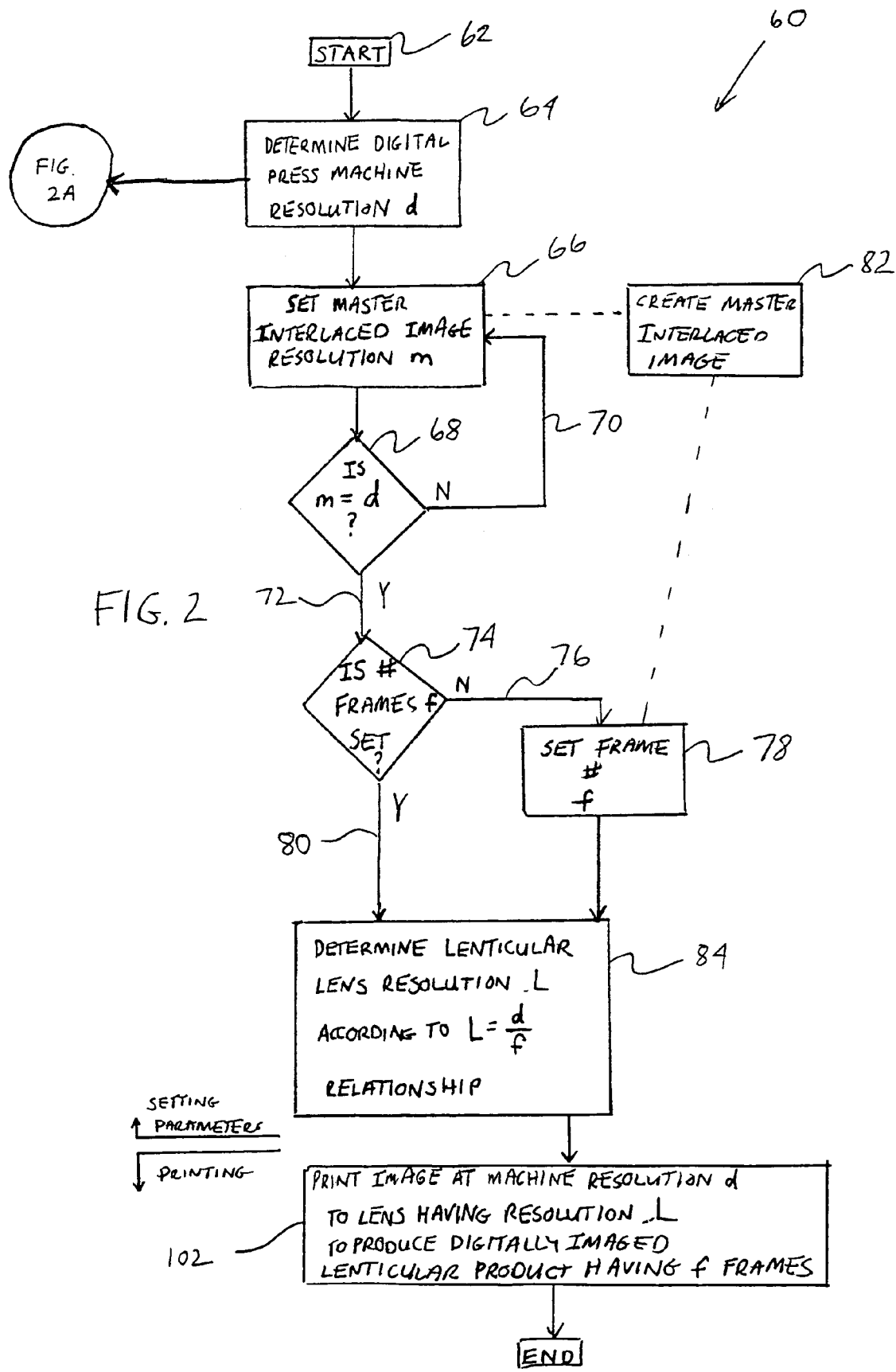
FIG. 2 is a flow chart illustrating a method for determining a lenticular lens for use in digital press printing according to one aspect of the present invention.

FIG. 2 is a flow chart illustrating a method, generally referred to by the numeral 60, for determining a lenticular lens for use in digital press printing according to one aspect of the present invention. One digital press suitable for use in the following methodology is the HP Indigo Press s2000, available from Hewlett-Packard, of Palo Alto, Calif. At the start 62, the method 60 comprises determining 64 a digital press machine or output resolution d, with the determining step further delineated in FIG. 2a and associated description below. A master interlaced image resolution m is set 66 for a master interlaced image such that the master interlaced image resolution is equal 68 to the machine resolution d. If not 70, the master interlaced image resolution is re-adjusted such that the equality will exist. Once the equality is established (i.e., that m=d), it is confirmed whether a number of frames f has been set 74. If not 76, the number frames f is set or selected 78 to be included in the master interlaced image, and if so 80, the number of frames is identified for use. The number of frames f can be determined at virtually any point in the process, and can be determined based on a variety of factors (e.g., intended multidimensional effect, complexity of the effect to be illustrated, technical limitations such as computer memory, etc.), however, it is of note that the number of frames f is an integer, and that integer must be identified or determined as part of the selection of the particular lenticular lens to be used. The steps of setting the master interlaced image resolution m and the setting of the number of frames f, namely steps 66 and 78, are accomplished preferably while creating the master interlaced image 82, explained further respect to the screen shots of FIG. 3 described below. Finally, a lenticular lens resolution L can be determined 84 according to the relationship $$L = d/f.$$

Again, the resolution or pitch is typically identified as lenticules per inch ("lpi").

Figure 2A:
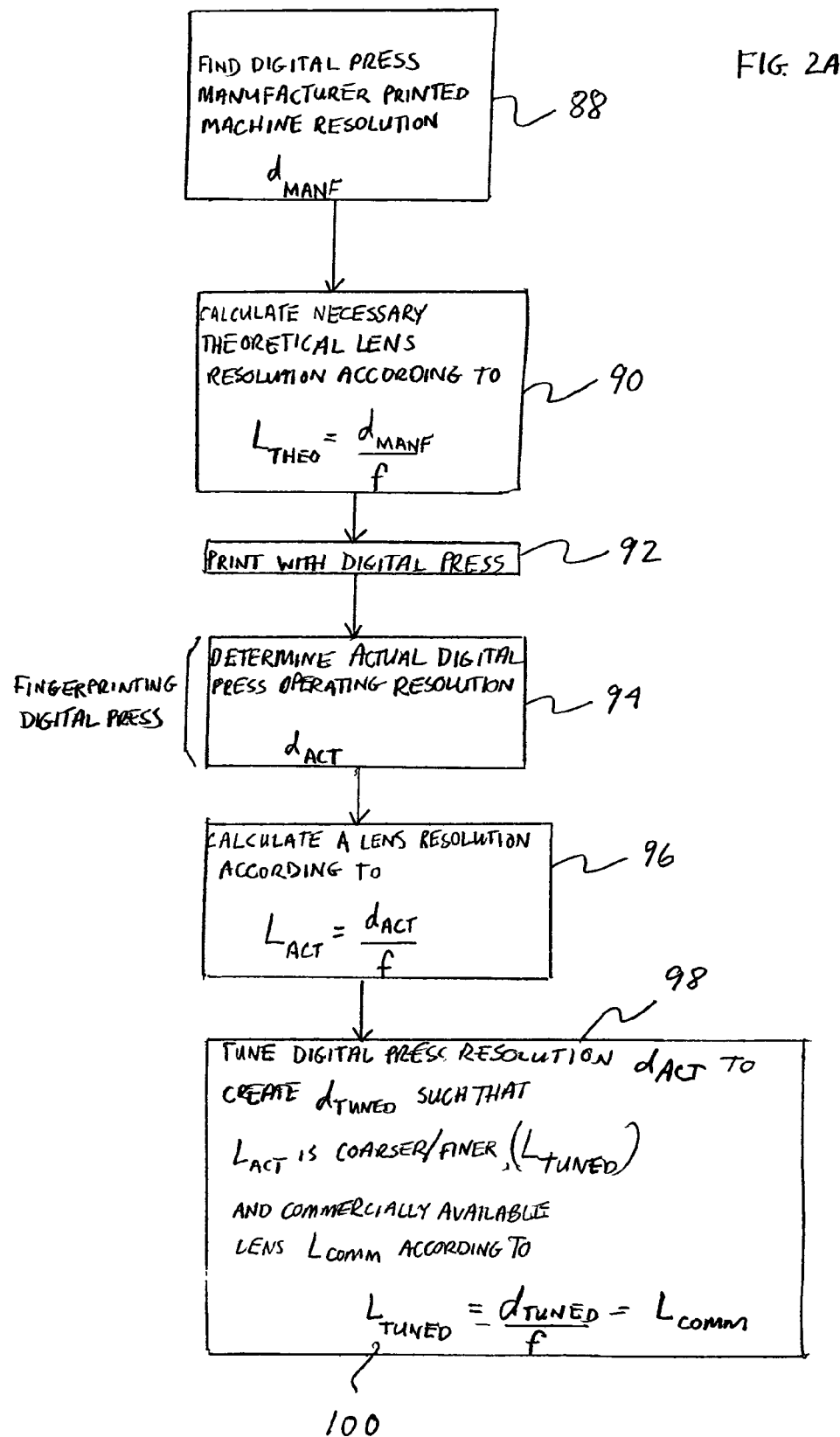
FIG. 2a illustrates a flow chart of additional steps that are taken in determining machine resolution as part of the method of FIG. 2.

FIG. 2a illustrates a flow chart of additional steps that are typically taken as part of the determining step 64. It is generally necessary to find 88 the machine or output resolution that is unique to the particular digital printing press being used to accomplish the printing of the interlaced image. Typically the manufacturer will identify what the machine resolution $d_{manf}$ is for a particular product. By way of example, in product literature, Hewlett-Packard identifies the s2000 as having a machine resolution $d_{manf}$ of 800 dots per inch ("dpi"). However, actual machine resolution $d_{act}$ may in fact vary from the stated machine resolution $d_{manf}$ in normal operation or use. Accordingly, a theoretical lenticular lens resolution $L_{theoretical}$ can be calculated 90 using the relationship:

$$L_{theoretical} = d_{manf} f.$$

An interlaced image can be printed 92 using the digital press, and the actual operating machine resolution $d_{act}$ can be determined 94 therefrom. For example, $d_{act}$ can be determined by end product technical inspection, or by comparison with outputs of known resolution. In this fashion, the digital printing press can be said to be "fingerprinted", that is, the identification of the machine resolution that accounts for variation from press to press.

An actual lens resolution $L_{act}$ can be calculated 96 according to the relationship:

$$L_{act} = d_{act} f.$$

To the extent that $L_{act}$ is a commercially available lens resolution, the lens selection process is complete. In most instances this will not be the case. To the extent that it differs, it is necessary to tune 98 the digital press such that printing in correspondence can occur. More specifically, the machine resolution $d_{act}$ is tuned to obtain a tuned machine resolution $d_{tuned}$. Tuning is accomplished by altering, adjusting, repositioning, or reconfiguring (to the extent possible) the mechanical, electromechanical and/or other operational components (e.g., mirrors, prisms, etc.) of the press to print the interlaced image such that it is in correspondence with the lenticular lens.

A tuned lenticular lens resolution $L_{tuned}$ can be calculated 100 according to the relationship:

$$L_{tuned} = d_{tuned} f.$$

In practice, $L_{tuned}$ will typically be coarser or finer than $L_{act}$ previously calculated. Ideally, $L_{tuned}$ is a value that matches a standard commercially available lenticular lens resolution $L_{comm}$ (e.g., 100 lpi, 150, lpi, 200 lpi, etc.). In practice, such commercially available lenses typically vary to some extent from the stated numbers, for example, the "100 lines per inch" or "100 line" lens is actually on the order of about 101.5 lpi. Accordingly, the tuning of the digital press preferably results in an equality summarized as:

$$L_{tuned} = L_{comm}.$$

In this manner, a commercially available lenticular lens can be used in a digital printing press, accounting for actual operating conditions, which can result in digitally imaged lenticular products having the desired number of frames, while providing an interlaced image that is in correspondence with the lenticular lens.

In one embodiment, exemplary lens resolutions can be in a range of between about 10 and about 250 lines per inch (lpi), although higher lens resolutions are possible and considered within the scope of the present invention. In another embodiment, exemplary lens resolutions can be in a range of between about 90 and 110 lpi. In another embodiment, exemplary lens resolutions can be in a range of between about 130 and about 160 lpi. In still another embodiment, exemplary lens resolutions can be in a range of between about 190 and about 210 lpi. And in yet another embodiment, exemplary lens resolutions can be about 101.6 lpi, 116.1 lpi, 135.5 lpi, 162.6 lpi, 203.2 lpi, 270.9 lpi, or 406.4 lpi.

Referring again to FIG. 2, following lens selection, and determination of the relevant parameters associated therewith, printing 102 of an interlaced image can be accomplished. More specifically, an interlaced image is printed 102 at a machine resolution d to the selected lenticular lens having a resolution L can be accomplished, thereby creating a digitally output lenticular image having f frames, where the image and lens are in correspondence.

Figure 3:
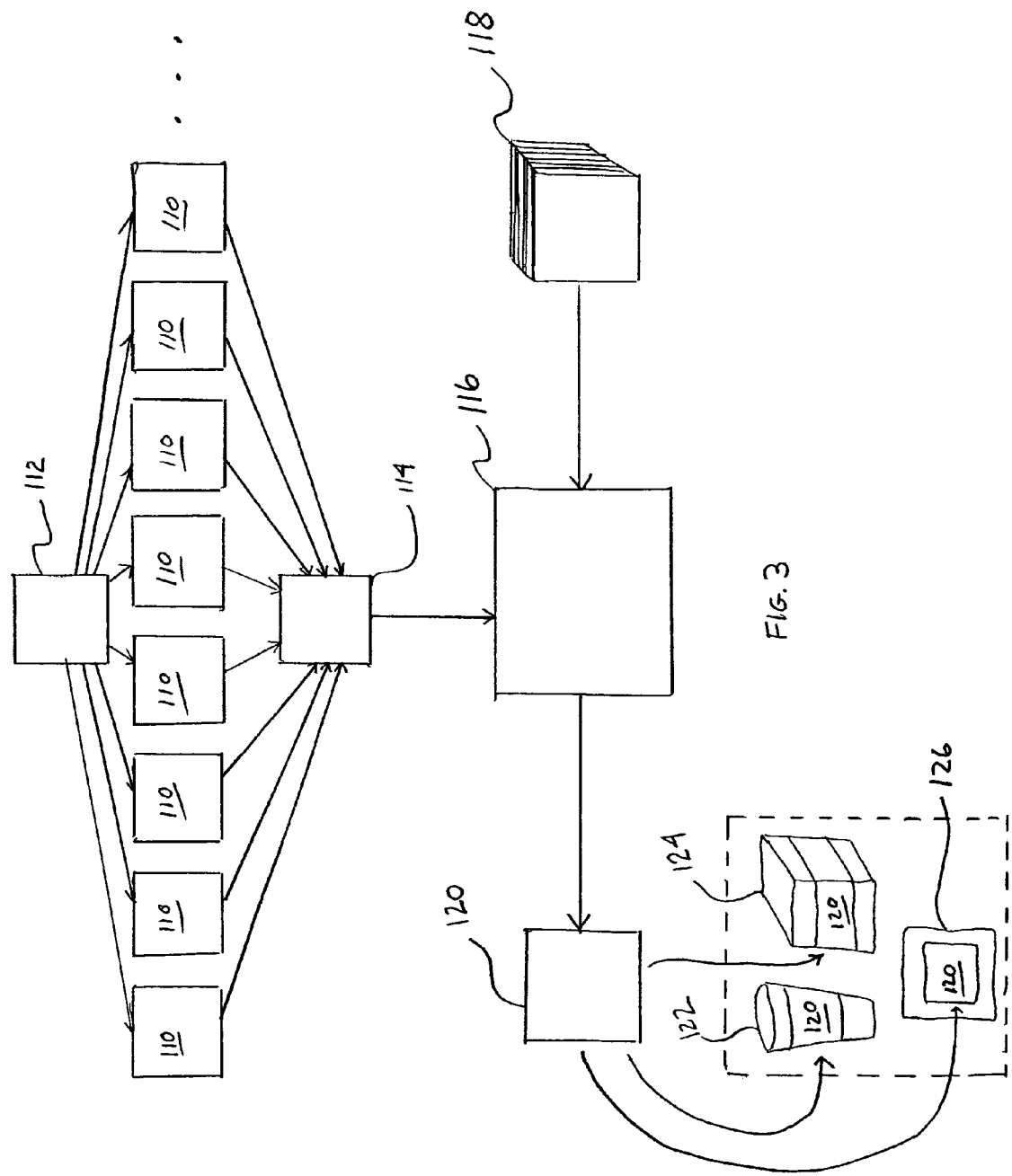
FIG. 3 is a schematic flow chart of a method for systematically selecting the lens for use in producing a digitally output lenticular image according to one aspect of the present invention.

FIG. 3 is a schematic flow chart of a method for systematically selecting the lens for use in producing a digitally output lenticular image according to one aspect of the present invention. Initially, a plurality of frame files 110 is created and the frame files include each image or frame to be included in the interlaced image. Alternatively, layered file 112 can be provided from which the plurality of frame files 110 can be created, the layered file and frame files created using commercially available software, such as Adobe® Photoshop®. In the examples shown, there are eight (8) frame files, but the number of frame files can vary to convenience (e.g., 6, 12, 24, etc.) depending on, among other things, the multidimensional effect to be created. In general, there is typically a one-to-one correlation between the number of frames f and the number of frame files. For example, in a simple flip image, there would typically be 2 frame files created for 2 base images or frames. Frames may be repeated as necessary, for example to give greater weight in the overall interlaced image to certain frames or images, and these are know in the art as "hero" frames, and the process is generally called "heroing". Similarly, the number of layers of imaging in the layered file can vary depending, for example, on the complexity and number of base images to be included in the interlaced image. The layered file(s) can take a variety of formats, for example, TIFF, PSD (available from Adobe®), among others, as is desired by the creator. The frame file(s) can also take a variety of formats, for example, TIFF, GIF, or JPEG, among others.

Figure 4:
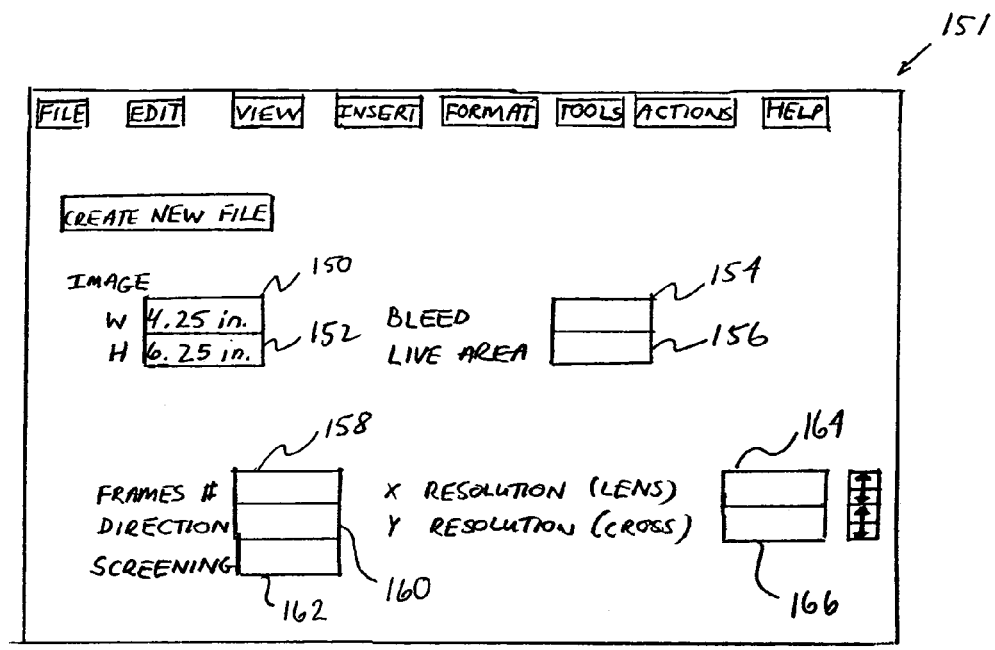
FIG. 4 is a schematic illustration of a computerized data field that can be populated to accomplish at least one aspect of the present invention.
Figure 5:
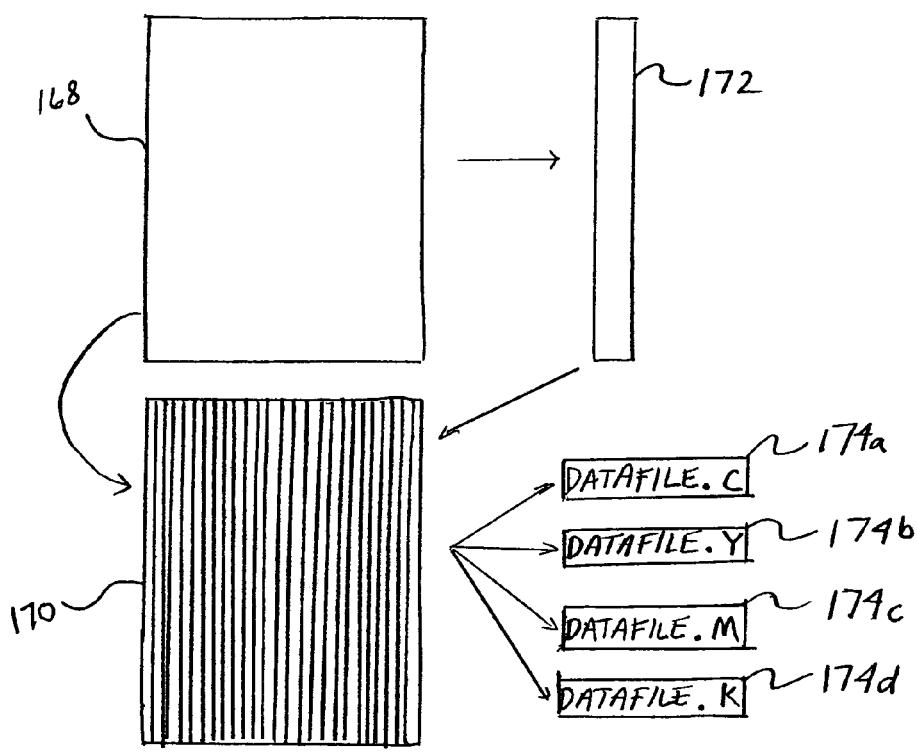
FIG. 5 is a schematic graphical representation of the compressing, interlacing and creation of frame files that may be used in at least one aspect of the present invention.

A master interlaced image file 114 is created from the frame files 110, and this is illustrated in greater detail in FIGS. 4–5. FIG. 4 is a schematic illustration of a computerized data field that can be populated to accomplish at least one aspect of the present invention. FIG. 5 are schematic graphical representations of a frame and a master file that are created as part of at least one aspect of the present invention. In FIG. 4, block area 151 is representative of a graphical user interface (GUI) that can be part of a commercial software program (which can be customized if necessary). Exemplary data fields can include, for example, image width 150, image height 152, image bleed 154, live area for the image 156. Other pertinent information can be included or otherwise accounted for in printing the interlaced image digitally to the desired and selected lenticular lens, for example, the number of frames in the image 158, the direction or image orientation 160, and the particular screening technique (e.g., stochastic) 162 to be used.

"Screening" refers to the process of converting a continuous tone image to a matrix of dots in sizes proportional to the highlights (i.e., the lightest or whitest area of an image) and shadows (i.e., the darkest portions of the image) of the continuous tone image. Image screening techniques can include, for example, half-tone screening and stochastic screening. In conventional half-tone screening, the number of dots per inch remains constant, although the size of the dots can vary in relation to the tonal range density of the pixel depth that they represent. Stochastic or frequency-modulated (FM) screening can create the illusion of tone. Stochastic screening techniques typically yield higher resolutions than are typically obtained in conventional half-tone dot screening. Stochastic screening utilizes finer spots, and results in a higher resolution. In general, stochastic screening is preferable when smaller or finer images are utilized, and when it is desired to illustrate greater detail.

It is further contemplated that screening, whether using halftone, stochastic, or any other technique, can take place prior to interlacing, after interlacing but prior to sending the interlaced image to an output device (preferably a high resolution output device), or after sending the interlaced image to the Raster Image Processor, that is, a "RIP", (e.g., Adobe® PostScrpt®) of the output device.

Still referring to FIGS. 4 and 5, the appropriate image resolution corresponding with the lenticular lens resolution or pitch is identified, taking into account generally more than one direction, for example a first direction 164 coinciding with the lenticules of the lens, and a second resolution 166 coinciding with a direction perpendicular to, or across, the lenticules of the lens. These directions are indicated with respect to the lens 10 of FIG. 1.

Referring to FIG. 5, the creation of the master interlaced image is shown. More specifically, using the data obtained via the fields shown in FIG. 4, the frame files 168 can either be directly interlaced using the screening methodology of FIG. 4 to create the master interlaced image 170, or alternatively, each of the frame files 168 can be compressed 172 prior to screening the files and creating the master interlaced image file. Whether screening or interlacing takes place first, with respect to the screening technique or algorithm used, it is preferable to created the master interlaced image such that little, if any, degradation occurs to the master interlaced image. Master interlaced image 170 can be separated and stored in individual color data files correlating with component colors. In the embodiment shown, subtractive color scheme CYMK is used, but in an alternative embodiment, additive color scheme such as RGB may be utilized. It is contemplated that other color models, including but not limited to, hexachrome, hi-fi color, extended color gamut (e.g., including light cyan "c" and regular cyan "C"), spot colors, bumps, among others. In this way, the master interlaced image 170 can be screened according to individual colors forming the basis for each individual color data file 174a–d.

Turning to FIG. 3, having obtained the master interlaced image file 114, as well as associated component color data files 174a–d (FIG. 5), the file information can be sent to a digital printing press 116, such as the H-P Indigo press s2000, or other suitable digital press. The lenticular lens 118 of known resolution, as determined according to the methodology outlined above in FIGS. 2 and 2a, can be, in one embodiment, utilized as the media or substrate upon which interlaced image (created from the master interlaced file) is digitally printed. More specifically, the lens is positioned to receive the printed image directly on its flat back surface. Alternatively, the interlaced image can be printed to another substrate (e.g., paper, plastic, metal, glass, or wood) and the substrate with the printed interlaced image thereon subsequently joined (e.g., via an adhesive) to the lenticular lens in a manner that achieves correspondence between the lens and the image. The result is a digitally output lenticular image 120 which can itself be a finished product, or alternatively, incorporated as a unique or significant feature of a subsequent product, for example, a container (e.g., a cup) 122, a package 124, or a label 126.

Of course, from application or overall project perspective, the appropriate lenticular lens is selected to accommodate the image and the predetermined viewing distance. For a large application, such as a billboard or bus shelter, or a vending machine facade, a thick, coarse lenticular lens is usually preferred. For smaller application, such as a cup, a label or a package, a fine lenticular lens is typically preferred. Coarse lenticular lenses have fewer lenticules per linear inch than fine lenticular lenses. Other factors often considered in the choice of a lenticular lens include the thickness, flexibility, the viewing distance, the cost of the lens, among others. Increasingly, finer lenticular lenses are becoming more possible and commercially feasible.

FIGS. 6A–C illustrate schematic interlaced images 200 for use in digitally imaged lenticular products having individualized graphic elements 202a–c and variable serial data 204a–c with a given background version 206, which is of a tropical scene in this embodiment. It is noted that the interlaced images 200 are shown schematically in that they are shown as they would be viewed through the lens, and not in the form of an underlying or precursor image, or as would be viewed on a computer screen, as such images would be broken or fragmented. In this fashion, the individualized graphic elements 202a–c and variable serial data 204a–c and given background version 206 can be viewed more clearly. In a digital press print run in which digital interlaced images 200 are created, the individualized graphic elements 202a–c and the variable serial data 204a–c can be changed on a per image basis, while the version is kept constant throughout the run. The variability of the digitally output interlaced image 200 results from the master interlaced image file (described above) including at least one individually customizable element. It is noted here that the at least one individually customizable element can include at least one of: a background image, a photograph, graphic art, a graphic, typeface, text, a numeric code, an alphanumeric code, a logo, a trademark, a bar code, computer-generated art, digital art, a vignette, a tint, dimensional art, a graph, a chart, vector art, a vector component, and a serial number. In one embodiment, the individually customizable element is versionable. By "individually customizable element" it is meant that the element can be varied from one interlaced image to the next, versioned from one set or plurality of interlaced images to the next, or some combination of the two (and thus imparting the varying or versioning to the ultimate digitally imaged lenticular products once the interlaced images are joined to the determined lenticular lens). Applications for such interlaced images include, but are not limited to, digitally imaged lenticular products such as drivers licenses, credit or debit cards, gift cards and company or other identification cards, among others.

Figure 6I:
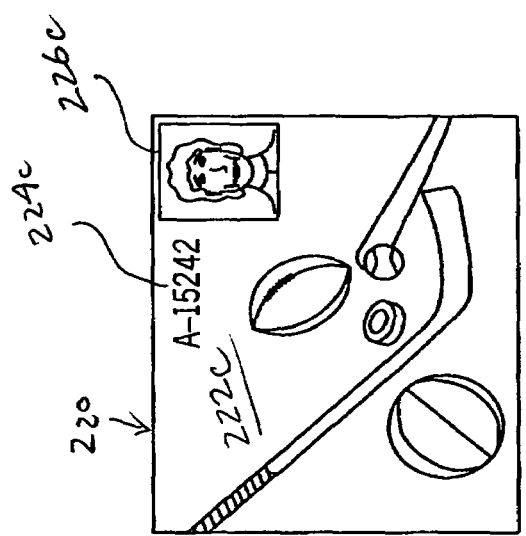
FIGS. 6G–I illustrate digitally imaged lenticular products having versioned background elements and variable serial data with individualized graphic elements.
Figure 6H:
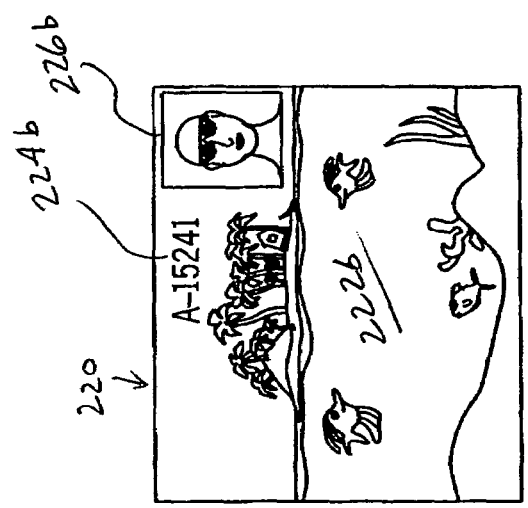
Figure 6G:
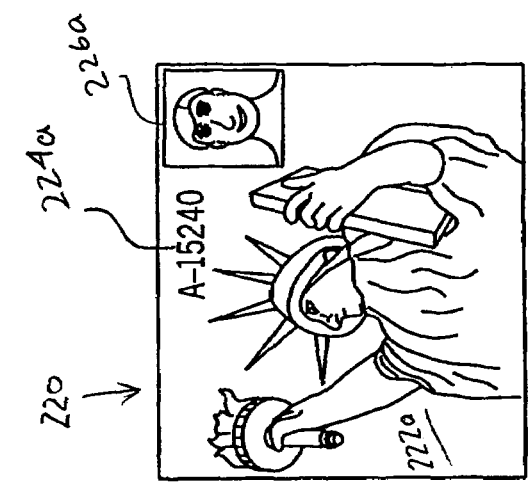

FIGS. 6D–F illustrate digitally printed interlaced images 210 for use in digitally imaged lenticular products having versioned background elements 212a–c and variable serial data 214a–c with a given or non-varying individualized graphic element 216. The background elements 212a–c are "versioned" in that they vary, as does the serial data 214a–c. However, the graphic element 216 remains constant. In this example, background 212a is "Statue of Liberty" version of a background, background 212b is a "Tropical" version of a background, and background 212c is a "Sports" version of a background. In this case, the non-varying individualized graphic element 216 is of a human being. In this embodiment, it can be said that, for a given user, the versioned background elements 212a–c and variable serial data 214a–c individually customizable elements, as listed above. It shall understood that, depending upon the application at hand, certain "customizable" elements may in fact be a randomly assigned, or a serial run of numerical or alphanumerical data. Applications for such interlaced images include, but are not limited to, digitally imaged lenticular products such as corporate promotional materials and point-of-purchase displays, among others. FIGS. 6G–I illustrate digitally printed interlaced images 220 for use digitally imaged lenticular products having versioned background elements 222a–c, variable serial data 224a–c, as well as with individualized graphic elements 226a–c. In this instance, the versioned background elements 222a–c, variable serial data 224a–c, as well as with individualized graphic elements 226a–c can be varied, and thus, are individually customizable, whether from one print run to the next, or within a print run. Applications for such interlaced images include, but are not limited to, digitally imaged lenticular products such as credit or debit cards, corporate promotional information or materials, business cards, gift cards, identification cards, event tickets, among others.

A significant benefit of creating interlaced images, and their resultant products, using a digital press, is that varying the individually customizable elements (e.g., one or more of the background elements, variable serial data, and individualized graphic elements) can be accomplished from one run to another, or within a run, without the down time associated with lithographic processes. As such, whether the interlaced images are those of FIGS. 6A–C, 6D–F, or 6G–H is of little consequence for purposes of efficiency.

The aforementioned interlaced images comprise individually customizable elements can be interlaced so as to result in, or contribute to, the multidimensional effect that is desired (i.e., the effect, whether flip, zoom, morph, depth, or some combination or alterative thereto) for a user to view when viewing the interlaced image through the lens at an appropriate viewing distance.

Figures 7A, 7B, 7C:
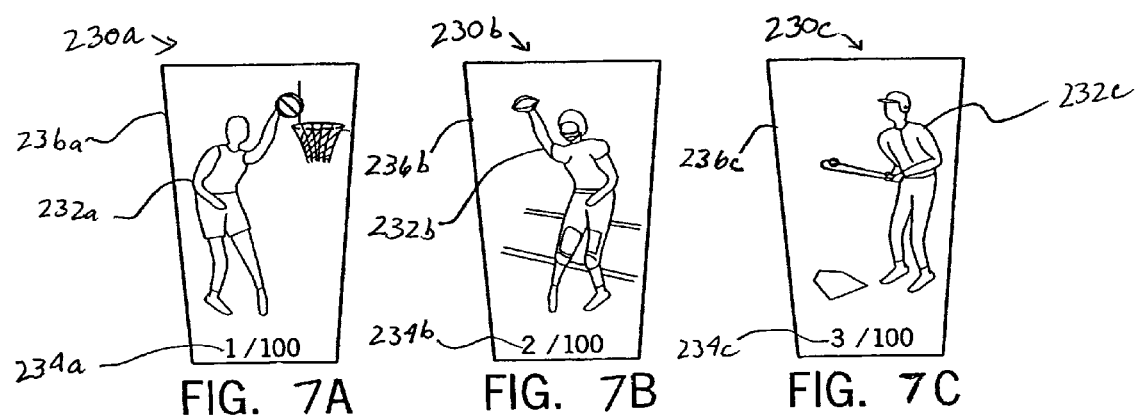
FIGS. 7A–C illustrate digitally imaged lenticular products having versioned background elements incorporated into a cup.

FIGS. 7A–C illustrate exemplary digitally imaged lenticular products 230a–c having versioned background elements 232a–c and variable serial data 234a–c. Here, the product is a cup 236a–c. As illustrated, the background elements 232a–c vary in that they are sports figures shown "playing" one of basketball, football and baseball, respectively. The variable serial data 234a–c varies as well from cup-to-cup. In the example shown, the variable serial data 234a–c is exemplified in a "Limted Edition" identifier. It is contemplated that the cups incorporating digital lenticular technology can be made according to known techniques for manufacturing such lenticular products.

Figure 8:
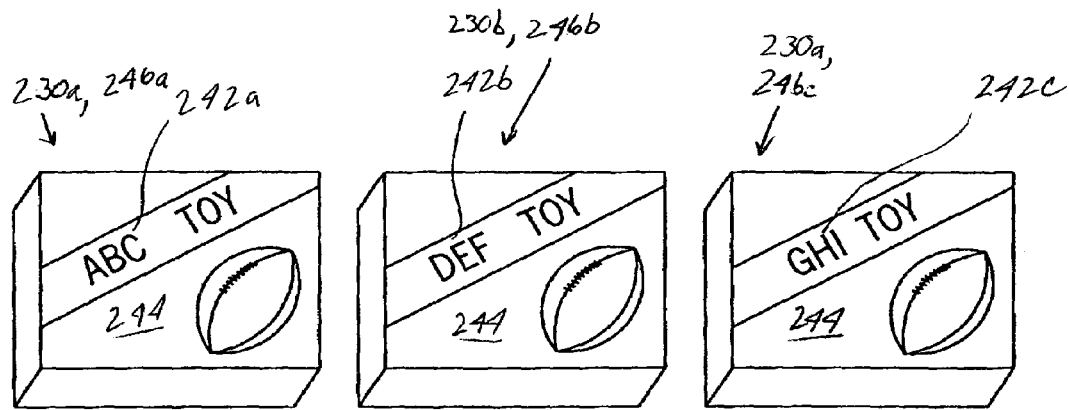
FIGS. 8A–C illustrate digitally imaged lenticular products having variable data for a given background version incorporated into a package.

FIGS. 8A–C illustrate exemplary digitally imaged lenticular products 230a–c having variable data 242a–c for a given background version 244, here incorporated into packages 246a–c. As illustrated, the variable data 242a–c, in this case made up of text information, varies from one package to the next, while the background (a football) 244 is of a single version, and thus, does not change. The variable data includes the varying character strings "ABC TOY" "DEF TOY" and "GHI TOY".

Figure 9:
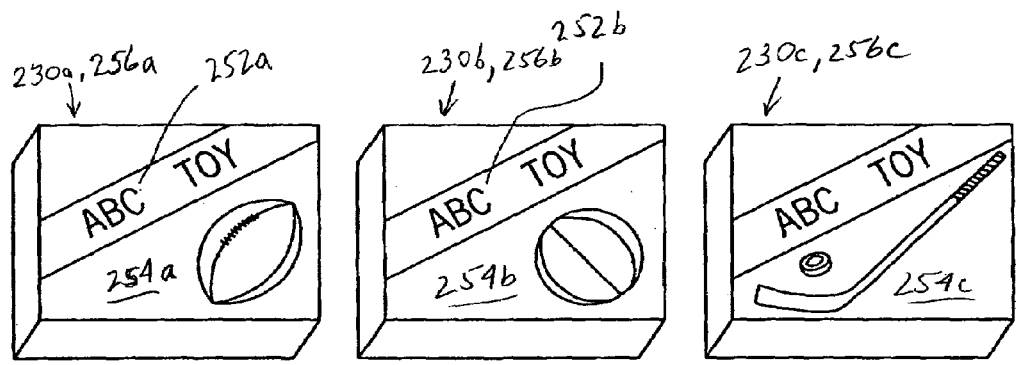
FIGS. 9A–C illustrate digitally imaged lenticular products having versioned background elements incorporated into a package.

FIGS. 9A–C illustrate exemplary digitally imaged lenticular products 230a–c having given data 252a–c and versioned background elements 254a–c, here incorporated into packages 256a–c. As illustrated, the variable data 252a–c, in this case made up of text information, that does not vary from one package to the next. Here, in contrast to the packages illustrated in FIGS. 8A–C, the background elements are versioned, and thus vary, from one package to the next. The variable data includes the nonvarying character string "ABC TOY". The versioned backgrounds include a football, basketball, and hockey elements.

Figures 10A, 10B, 10C:
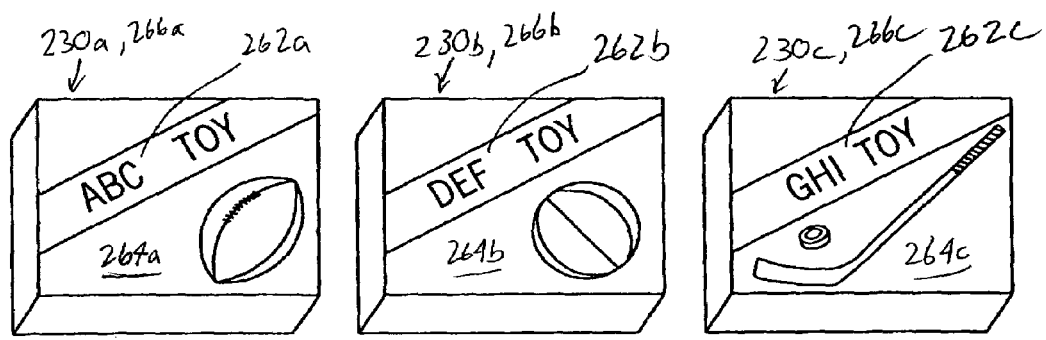
FIGS. 10A–C illustrate digitally imaged lenticular products having versioned background elements and variable data incorporated into a package.

FIGS. 10A–C illustrate exemplary digitally imaged lenticular products 230a–c having variable data 262a–c and versioned background elements 264a–c, here incorporated into packages 266a–c. As illustrated, the variable data 262a–c, in this case made up of text information, varies from one package to the next and the background elements are versioned, and thus vary, from one package to the next. The variable data includes the varying character strings "ABC TOY" "DEF TOY" and "GHI TOY". The versioned backgrounds include football, basketball, and hockey elements.

Figure 11C:
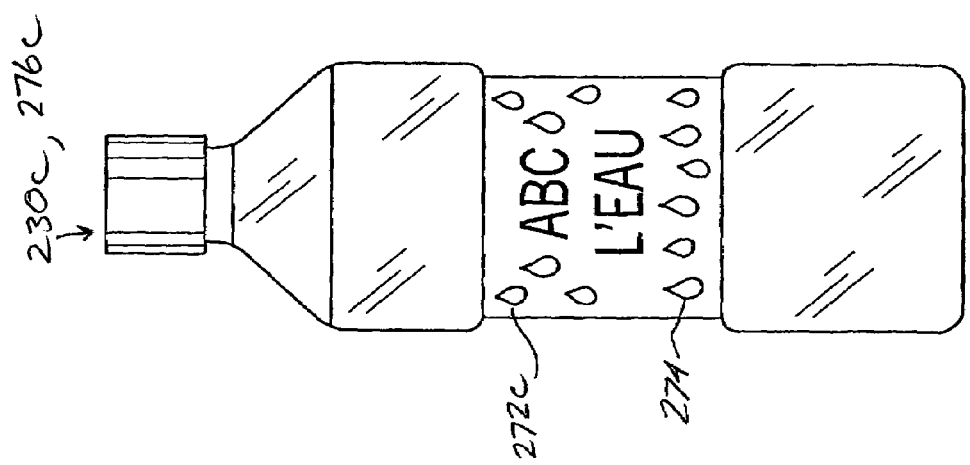
FIGS. 11A–C illustrate digitally imaged lenticular products having versioned elements incorporated into a container.
Figure 11B:
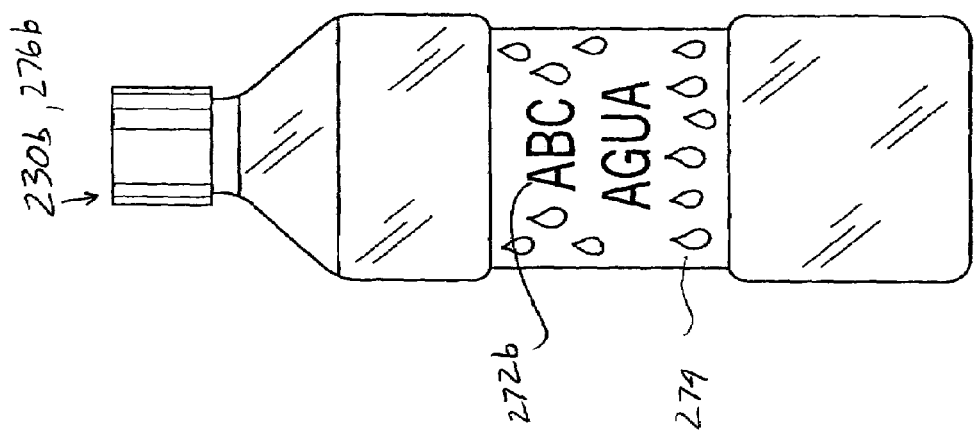
Figure 11A:
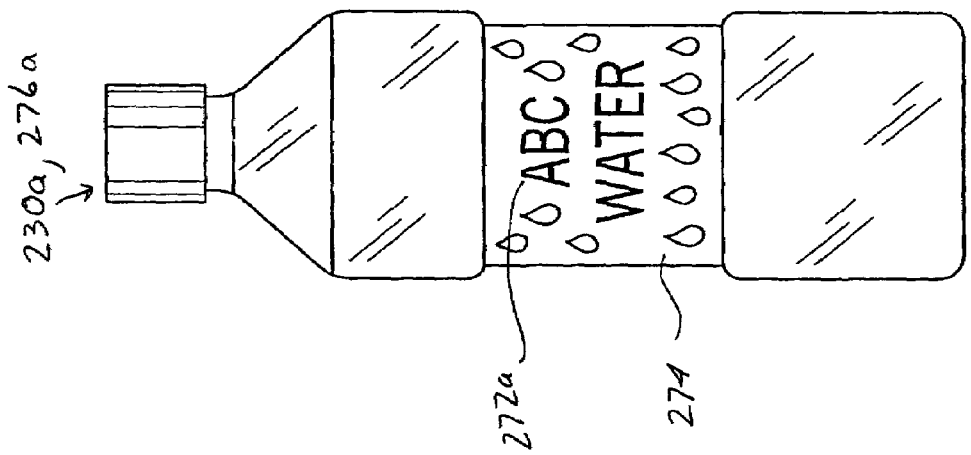

FIGS. 11A–C illustrate exemplary digitally imaged lenticular products 230a–c having variable data 272a–c and non-versioned background elements 274, here incorporated into containers 276a–c (e.g., water bottles). As illustrated, the variable data 272a–c, in this case made up of text information, varies from one container to the next. The variable data includes the varying character strings "ABC WATER" "ABC AGUA" and "ABC L'EAU". Here, however, background elements are non-varying, and thus remain the same, from one container to the next. The background, as shown, includes water droplet elements.

The invention further comprises a method for creating a digitally output interlaced image. The method comprises: providing a lenticular lens having an array of lenticules defining a front surface, and a substantially flat back surface located opposite the front surface; and digitally outputting an interlaced image, the interlaced image to be joined to the substantially flat back surface of the lens so as to be in correspondence with the array of lenticules, and the interlaced image including at least one individually customizable element.

The invention also comprises a method for creating a plurality of digitally image lenticular products, the method comprising: providing a lenticular lens having an array of lenticules defining a front surface, and a substantially flat back surface located opposite the front surface; digitally outputting a first interlaced image, the first interlaced image to be joined to the substantially flat back surface of the lens so as to be in correspondence with the array of lenticules, to create a first digitally output lenticular image; and digitally outputting a second interlaced image, the second interlaced image to be joined to the substantially flat back surface of the lens so as to be in correspondence with the array of lenticules, to create a second digitally output lenticular image; wherein the first digitally output lenticular image includes an interlaced image that is at least one of versioned and varied with respect to the interlaced image of the second digitally output lenticular image.

Methods have been described and outlined in a sequential fashion. Still, modification, rearrangement, reordering, or the like, of the methods is contemplated and considered within the scope of the appending claims. More generally, while the present invention has been described in terms of one or more preferred embodiments, it is recognized that equivalents, alternatives, and modifications, aside from those expressly stated, are possible and within the scope of the appending claims.

What is claimed is:

1. A method for creating a plurality of digitally imaged lenticular products, the method comprising:
    providing a lenticular lens having an array of lenticules defining a front surface, and a substantially flat back surface located opposite the front surface;
    digitally outputting a first interlaced image, the first interlaced image to be joined to the substantially flat back surface of the lens so as to be in correspondence with the array of lenticules, to create a first digitally output lenticular image; and
    digitally outputting a second interlaced image, the second interlaced image to be joined to the substantially flat back surface of the lens so as to be in correspondence with the array of lenticules, to create a second digitally output lenticular image;
    wherein the first digitally output lenticular image includes an interlaced image that is at least one of versioned and varied with respect to the interlaced image of the second digitally output lenticular image.

2. The method of claim 1 wherein the providing step includes determining a lenticular lens resolution L according to the relationship L=d/f, where d is a digital printer machine resolution and f is a number of frames to be included in the interlaced image.

3. The method of claim 2 wherein the lens resolution L is between about 10 and about 250 lines per inch (lpi).

4. The method of claim 2 wherein the individually customizable element is integrated into at least one of the following multidimensional effects: flip, morph, depth, motion and zoom.

5. The method of claim 2 further comprising incorporating the digitally imaged lenticular products as part of at least one of a container, a cup, a label, and a package.

* * * * *